United States Patent
Blauvelt et al.

(12)

(10) Patent No.: US 7,943,229 B2
(45) Date of Patent: May 17, 2011

(54) SUPPRESSION OF STRAY LIGHT PROPAGATION IN A SUBSTRATE

(75) Inventors: Henry A. Blauvelt, San Marino, CA (US); David W. Vernooy, Sierra Madre, CA (US)

(73) Assignee: HOYA Corporation USA, San Jose, CA (US)

( * ) Notice: Subject to any disclaimer, the term of this patent is extended or adjusted under 35 U.S.C. 154(b) by 1196 days.

(21) Appl. No.: 11/382,007

(22) Filed: May 5, 2006

(65) Prior Publication Data

US 2006/0251849 A1  Nov. 9, 2006

Related U.S. Application Data

(60) Provisional application No. 60/678,713, filed on May 6, 2005.

(51) Int. Cl.
*B32B 7/02* (2006.01)
(52) U.S. Cl. .......... 428/212; 428/220; 428/447; 385/15; 385/50; 385/131
(58) Field of Classification Search .................. 428/1.1, 428/212, 220, 447; 385/15, 50, 131
See application file for complete search history.

(56) References Cited

U.S. PATENT DOCUMENTS

| 4,004,851 A | 1/1977 | Negishi et al. |
| 6,399,228 B1 | 6/2002 | Simpson |
| 6,965,714 B2 * | 11/2005 | Brock et al. ............... 385/33 |

OTHER PUBLICATIONS

International Search Report and Written Opinion dated Aug. 7, 2007 for corresponding PCT Application No. PCT/US06/17738.

* cited by examiner

*Primary Examiner* — Mark Ruthkosky
*Assistant Examiner* — Lawrence D Ferguson
(74) *Attorney, Agent, or Firm* — David S. Alavi

(57) ABSTRACT

An optical apparatus comprises: a substrate; an optical device, an optical waveguide, or an optical element on the first substrate surface; a reflection-suppressing layer on a second substrate surface opposite the first substrate surface; and an absorbing layer on the reflection-suppressing layer, so that over at least a portion of the second substrate surface the reflection-suppressing layer is between the second substrate surface and the absorbing layer. The absorbing layer absorbs light over at least a portion of an operative wavelength range of the optical apparatus, while the reflection-suppressing layer suppresses reflection from the second substrate surface of light over at least a portion of the operative wavelength range of the optical apparatus to a reflectivity value below that of the second substrate surface with only the absorbing layer present.

21 Claims, 3 Drawing Sheets

US 7,943,229 B2

SUPPRESSION OF STRAY LIGHT PROPAGATION IN A SUBSTRATE

BENEFIT CLAIMS TO RELATED APPLICATIONS

This application claims benefit of U.S. provisional App. No. 60/678,713 filed May 06, 2005, said provisional application being hereby incorporated by reference as if fully set forth herein.

BACKGROUND

The field of the present invention relates to optical apparatus. In particular, suppression of stray light propagation in a substrate is disclosed herein.

Suppression of stray light propagation in a substrate may be necessary or desirable in a variety of optical apparatus. For example, imperfect optical coupling (end-coupling or transverse-coupling) between optical waveguides, optical fibers, or optical devices such as lasers and modulators, may often result in substantial amounts of light "dumped" into a substrate on which these objects are formed or mounted. Many optical telecommunications apparatus are constructed or fabricated on high-index semiconductor substrates, which are often of high optical quality and transparent at the relevant operative wavelengths (typically between about 1200 nm and about 1700 nm; other wavelength ranges may be employed). Stray light, if allowed to freely propagate within the substrate and to reflect from the substrate surfaces, may interfere with the proper operation of the optical apparatus. Similar circumstances may arise with other substrate materials or in other wavelength ranges. Examples of circumstances wherein this might be the case include: i) optical apparatus that include one or more lasers or other light sources, which act as sources of stray light, and ii) optical apparatus that include at least one photodetector, wherein stray light incident on the photodetector may interfere with detection of an intended optical signal (so-called optical crosstalk). Various optical apparatus are disclosed herein that include an absorbing layer and a reflection-suppressing layer on the substrate for suppressing propagation of stray light in the substrate.

SUMMARY

An optical apparatus comprises: a substrate; at least one optical device on a first substrate surface, at least one optical waveguide formed on the first substrate surface, or at least one optical element formed on the first substrate surface; a reflection-suppressing layer on at least a portion of a second substrate surface opposite the first substrate surface; and an absorbing layer on at least a portion of the reflection-suppressing layer, so that over at least a portion of the second substrate surface the reflection-suppressing layer is between the second substrate surface and the absorbing layer. The absorbing layer absorbs light over at least a portion of an operative wavelength range of the optical apparatus, while the reflection-suppressing layer suppresses reflection from the second substrate surface of light over at least a portion of the operative wavelength range of the optical apparatus to a reflectivity value below that of the second substrate surface with only the absorbing layer present.

Objects and advantages pertaining to suppression of stray light propagation in a substrate may become apparent upon referring to the exemplary embodiments illustrated in the drawings and disclosed in the following written description and/or claims.

The embodiments shown in the Figures are exemplary, and should not be construed as limiting the scope of the present disclosure and/or appended claims.

DETAILED DESCRIPTION OF EMBODIMENTS

Figure 1:
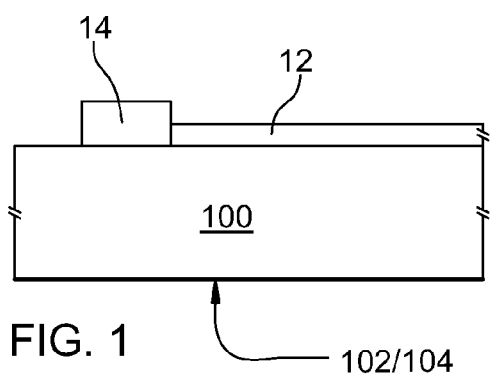
FIG. 1 illustrates schematically a substrate with an optical device, an optical waveguide, an absorbing layer, and a reflection-suppressing layer.
Figure 2:
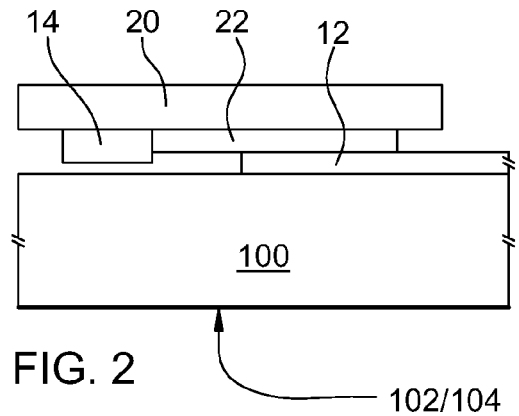
FIG. 2 illustrates schematically a substrate with an optical device, an optical waveguide, an absorbing layer, and a reflection-suppressing layer.
Figure 3:
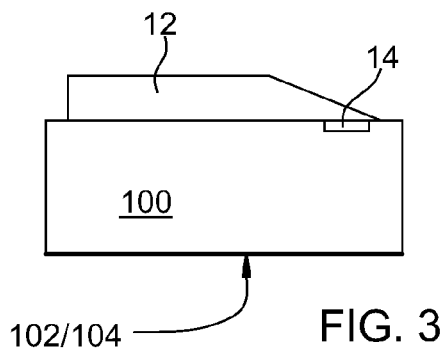
FIG. 3 illustrates schematically a substrate with an optical device, an absorbing layer, and a reflection-suppressing layer.
Figure 4:
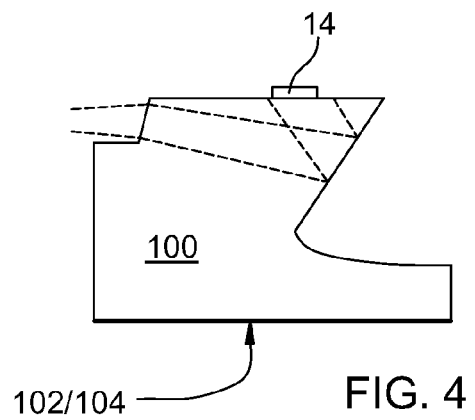
FIG. 4 illustrates schematically a substrate with an optical device, an optical waveguide, an absorbing layer, and a reflection-suppressing layer.

FIGS. 1-4, 5A/5B, and 6A/6B/6C illustrate several embodiments of optical apparatus, each comprising at least one optical device, at least one optical waveguide, or at least one optical element on a first surface of substrate 100. In FIG. 1, an optical waveguide 12 and an optical device 14 are positioned on the first substrate surface. The waveguide 12 or device 14 each may be formed on or mounted on substrate 100, and may be optically coupled for conveying an optical signal from device 14 to waveguide 12 or vice versa. Device 14 may comprise a laser or other optical signal source, an optical modulator, a photodetector, or any other suitable or desirable optical device. The embodiment of FIG. 2 differs from that of FIG. 1 only in that in FIG. 2, the optical device 14 is formed on a second substrate 20, which includes a second waveguide 22 that is optically coupled to the optical device 14. Upon mounting the optical device 14 on substrate 100 (directly, or indirectly via waveguide 12, waveguide 22, or substrate 20), waveguides 12 and 22 are positioned for optical coupling therebetween, thereby optically coupling waveguide 12 and device 14. In FIG. 2 the optical device 14 may again comprise a laser or other optical signal source, an optical modulator, a photodetector, or any other suitable or desirable optical device. In the embodiments of FIGS. 3 and 4, the optical device 14 is formed directly on substrate 10, which may include a waveguide 12 (as in FIG. 3), or not (as in FIG. 4). Optical device 14 comprises a photodetector in these examples; other embodiments may include other types of optical devices, such as those listed hereinabove, formed directly on substrate 100.

Figure 5A:
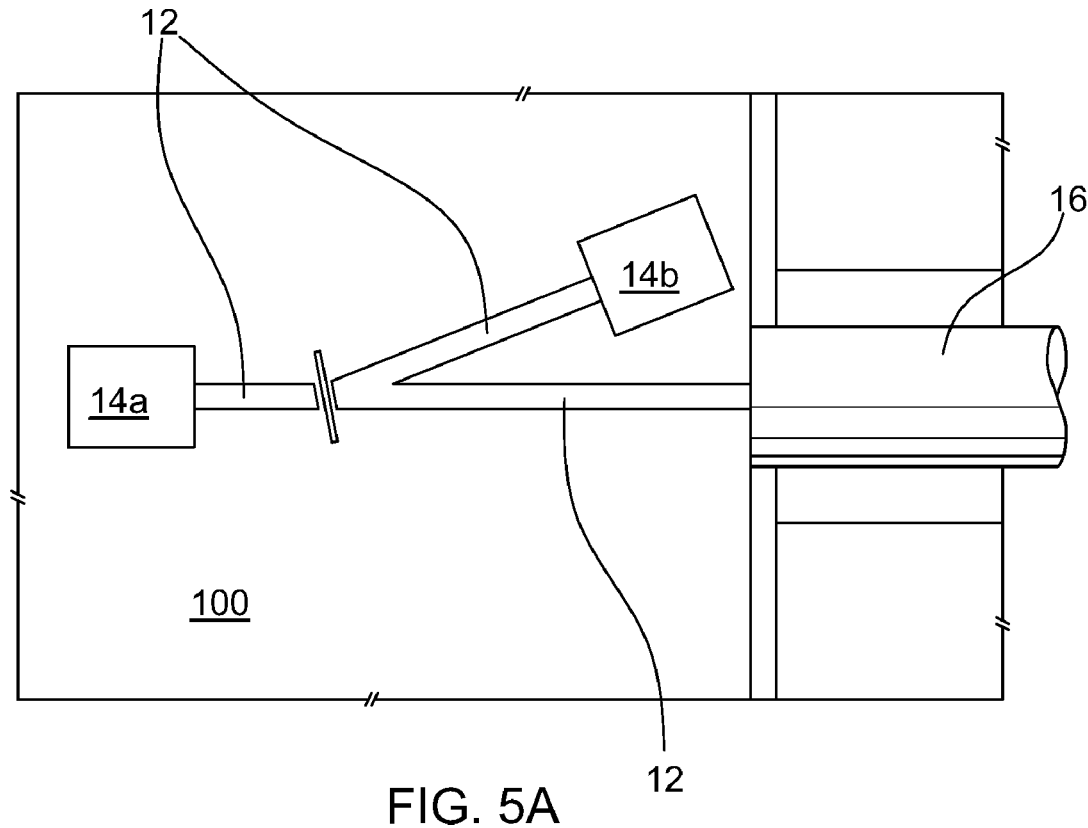
FIGS. 5A and 5B illustrate schematically a substrate with optical devices, optical waveguides, an absorbing layer, and a reflection-suppressing layer.
Figure 5B:
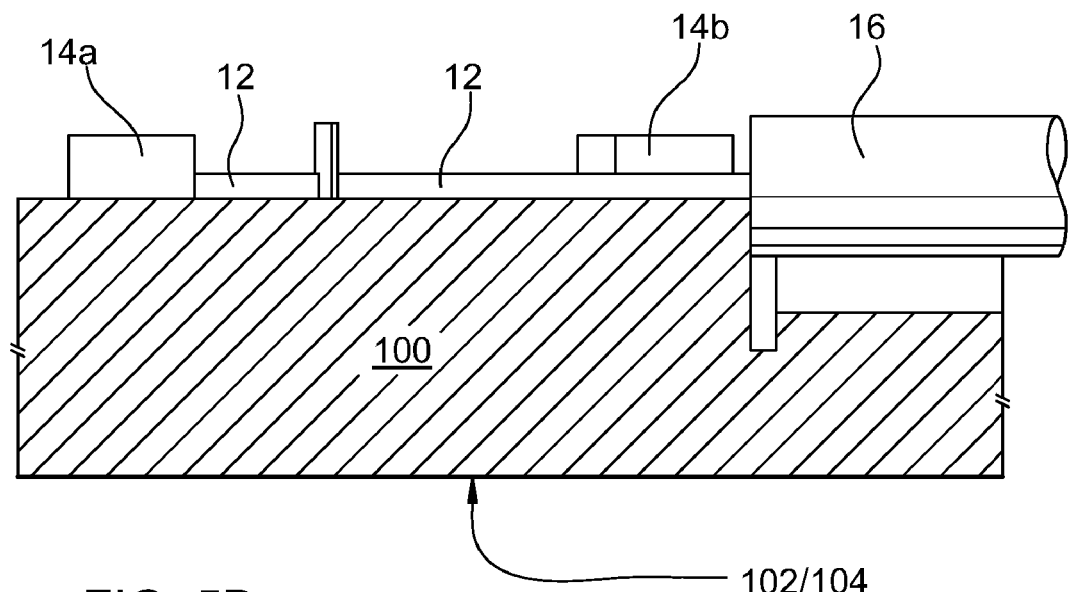
Figure 6A:
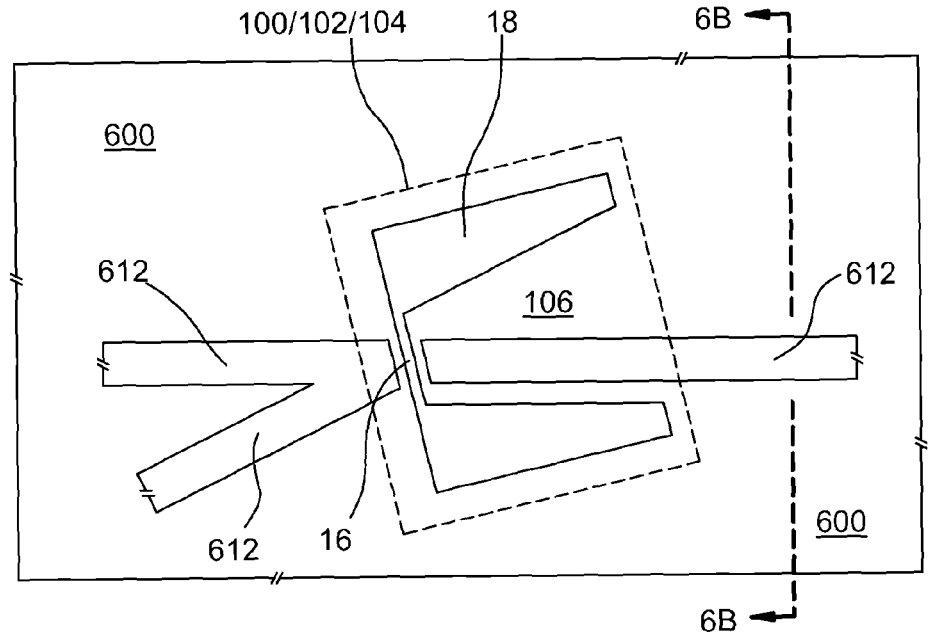
FIGS. 6A, 6B, and 6C illustrate schematically a substrate with an optical element, an absorbing layer, and a reflection-suppressing layer.
Figure 6B:
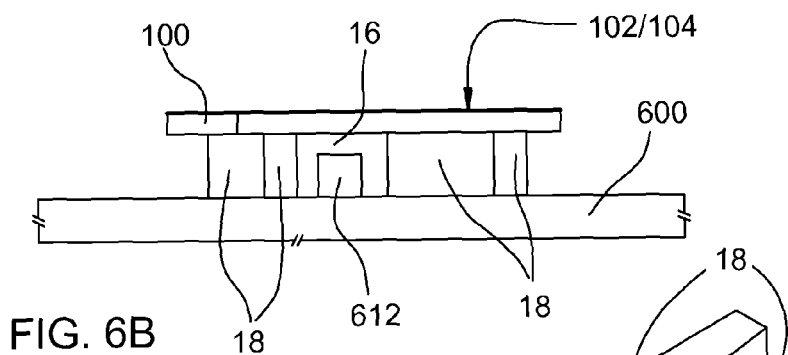
Figure 6C:
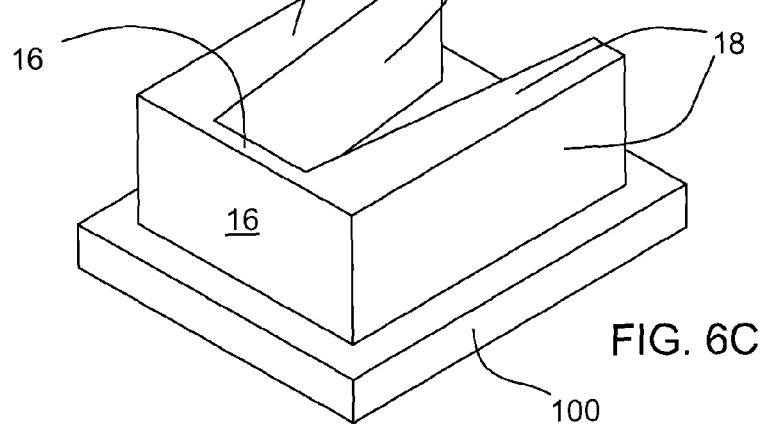

FIGS. 5A/5B illustrate schematically an exemplary bidirectional optical apparatus (such as a diplexer, as in this example, or a triplexer), including waveguides 12, laser 14a, and photodetector 14b all positioned on substrate 100. In this example, one of the waveguides 12 is end-coupled to an optical fiber 16 received in a groove in substrate 100. FIGS. 6A, 6B, and 6C illustrate schematically an optical element 16 formed on substrate 100, along with structural members 18. In the exemplary embodiment, optical element 16 comprises an optical filter, shown in FIGS. 6A and 6B mounted on a second substrate 600 between waveguides 612. Other embodiments may include other types of optical elements formed on substrate 100, including but not limited to filters, reflectors, lenses, waveplates, polarizers, and so forth.

In each of the embodiments of FIGS. 1-4, 5A/5B, and 6A/6B/6C, a reflection-suppressing layer 102 is formed on at least a portion of a second surface of the substrate 100 (the second substrate surface being opposite the first substrate surface). An absorbing layer 104 is formed on at least a portion of the second substrate surface, so that over at least a portion of the second substrate surface the reflection-suppressing layer is between the absorbing layer and the second substrate surface. Various embodiments of the reflection-suppressing layer 102 and absorbing layer 104 are illustrated schematically in FIGS. 7 and 8.

Figure 7:
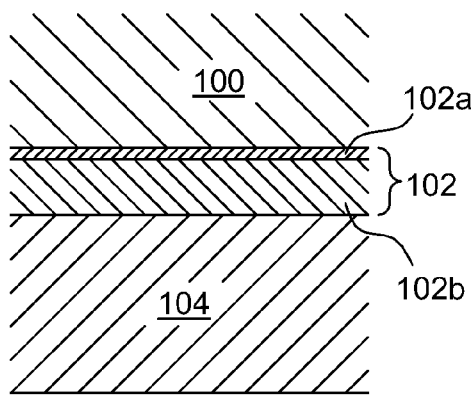
FIG. 7 illustrates schematically two reflection-suppressing sublayers and an absorbing layer on a substrate.

In FIG. 7, exemplary reflection-suppressing layer 102 and absorbing layer 104 are schematically illustrated, wherein the reflection-suppressing layer 102 comprises sublayers 102a and 102b. In a first example, substrate 100 may comprise a high-index semiconductor, such as silicon, doped silicon, germanium, doped germanium, various doped or undoped III-V semiconductors or alloys thereof, and so forth. The absorbing layer 104 typically may be sufficiently thick (based on material absorptivity) so that absorption is substantially complete for light entering the absorbing layer 104 over at least a portion of an operative wavelength range of the optical apparatus ("substantially complete" absorption being determined based on an operationally acceptable degree of stray light suppression). Absorbing layer 104 may comprise a metal layer, such as chromium or alloys thereof (sometimes referred to as "chrome"), titanium or alloys thereof, or other suitable metal, and such a metal absorbing layer typically may be greater than about 150 nm thick to ensure sufficient absorption over at least a portion of an operative wavelength range of the optical apparatus. Metal layers may under certain circumstances become partly oxidized without substantially degrading their optical absorptive properties, and such partly oxidized layers shall fall within the scope of the present disclosure or appended claims. Suitability of a given metal may be determined by sufficiency of optical absorption, material or processing compatibility with the substrate material or other layer materials, cost, availability, convenience, or other appropriate criteria.

In this first example, sublayer 102a typically may comprise a metal layer, typically but not necessarily the same metal employed for forming absorbing layer 104. The metal sublayer 102a may range between about 5 nm thick and about 20 nm thick. Sublayer 102b typically may comprise a dielectric layer, often but not necessarily the same semiconductor material that comprises the substrate 100. The dielectric sublayer may range between about 50 nm thick and about 100 nm thick. The thicknesses of the metal sublayer and the dielectric sublayer are chosen, based on the real and imaginary refractive indices of the substrate, the absorbing layer, the metal sublayer, and the dielectric sublayer, so as to reduce reflectivity from the second substrate surface below the reflectivity of the second substrate surface with only the absorbing layer present, over at least a portion of the operative wavelength range of the optical apparatus. Materials may be chosen based on real or imaginary refractive indices. Standard reflectivity calculations may be employed to calculate thicknesses or refractive indices required to yield a reflectivity minimum at a desired design wavelength. Reflectivity is typically reduced over a range of wavelengths around such a design wavelength. Design trade-offs may be made between the spectral width of a reflectivity minimum and the depth of that minimum. One exemplary design includes a silicon substrate, a chromium sublayer about 10 nm thick, a silicon sublayer about 75 nm thick, and a chromium absorbing layer about 200 nm thick. Other materials or thicknesses may be employed while remaining within the scope of the present disclosure or appended claims.

In a second example, each of sublayers 102a and 102b of reflection-suppressing layer 102 comprises a dielectric sublayer, while substrate 100 comprises a high-index semiconductor and absorbing layer 104 comprises a metal layer (as described hereinabove). If substrate 100 comprises silicon or doped silicon, for example, sublayer 102a may comprise silica (i.e. silicon dioxide), doped silica, silicon nitride, or silicon oxynitride, while dielectric sublayer 102b may comprise silicon or doped silicon, often but not necessarily the same material comprising substrate 100. In this example sublayers 102a and 102b may each range between about 40 nm thick and about 150 nm thick. The thicknesses of the dielectric sublayers are chosen, based on the real and imaginary refractive indices of the substrate, the absorbing layer, and the dielectric sublayers, so as to reduce reflectivity from the second substrate surface below the reflectivity of the second substrate surface with only the absorbing layer present, over at least a portion of the operative wavelength range of the optical apparatus. Materials may be chosen based on real or imaginary refractive indices. Standard reflectivity calculations may be employed to calculate thicknesses or refractive indices required to yield a reflectivity minimum at a desired design wavelength. Reflectivity is typically reduced over a range of wavelengths around such a design wavelength. Design trade-offs may be made between the spectral width of a reflectivity minimum and the depth of that minimum. One exemplary design includes a silicon substrate, a silicon nitride sublayer about 85 nm thick, a silicon sublayer about 85 nm thick, and a chromium absorbing layer about 200 nm thick. Another exemplary design includes a silicon substrate, a silica sublayer about 60 nm thick, a silicon sublayer about 95 nm thick, and a chromium absorbing layer about 200 nm thick. Other materials or thicknesses may be employed while remaining within the scope of the present disclosure or appended claims.

Figure 8:
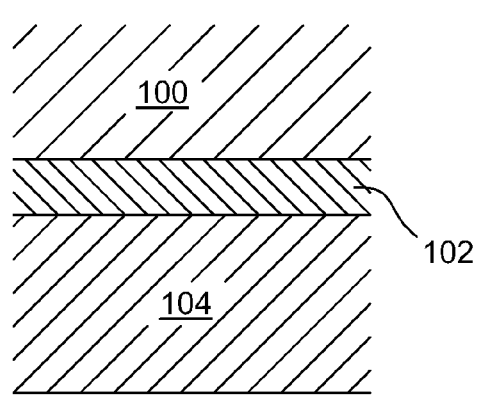
FIG. 8 illustrates schematically a reflection-suppressing layer and an absorbing layer on a substrate.

In FIG. 8, exemplary reflection-suppressing layer 102 and absorbing layer 104 are schematically illustrated, wherein the reflection-suppressing layer 102 comprises a single dielectric layer. The absorbing layer 104 may comprise a metal or other absorbing material selected as described hereinabove, of a thickness to provide sufficient absorption over a desired wavelength range. A single dielectric layer 102 is formed on at least a portion of the second surface of substrate 100, between the second substrate surface and absorbing layer 104. The layer 102 may comprise a material chosen having suitable real and imaginary refractive indices, and the layer thickness may be selected so as to yield a reflectivity minimum at a design wavelength. Relative to the two-sublayer reflection-suppression layer 102 of the embodiments described hereinabove, a single-layer reflection-suppressing layer 102 may provide a lesser degree of reflection suppression, or may provide such reflection suppression over a smaller range of wavelengths (since there are fewer thickness and index parameters to manipulate). Material selection may be restricted as well, since the index of the layer 102 is typically chosen to be between that of substrate 100 and that of the absorbing layer 104. However, fabrication of optical apparatus with a single-layer reflection-suppressing layer 102 requires two deposition steps instead of three, and may therefore be preferable in circumstances wherein less stray light suppression may be tolerable in exchange for simplified or less expensive fabrication.

Roughness of the second surface of substrate 100 may degrade suppression of stray light, if substantial light scattering occurs at the second surface. The second surface of substrate 100 should be sufficiently smooth so that light scattering therefrom is at or below an operationally acceptable level. Depending on the nature of the substrate employed and the means for its manufacture, and the degree of stray light suppression required or desired, additional processing steps may or may not be required for sufficiently smoothing the second substrate surface prior to forming layers 102 and 104.

In many of the preceding examples, substrate 100 comprises a semiconductor. In many instances a semiconductor substrate will have an oxide coating on its second surface (intentional in some cases, unintentional in others). In such instances, it is typically the case that such an oxide coating is removed prior to forming the reflection-suppressing layer 102 and the absorbing layer 104. Even if the reflection-suppressing layer comprises an oxide layer, the layer thickness should typically be precisely controlled to achieve the desired degree of reflection suppression.

In the exemplary embodiments of FIGS. 1, 2, and 5A/5B, additional suppression of stray light may be achieved by depositing an additional reflective layer on the first surface of substrate 100, covering the majority of the substrate surface and perhaps also covering waveguides, components, or devices thereon. Stray light initially propagating toward the first surface of substrate 100 is redirected toward the layers 102/104 on the second surface of substrate 100 by this additional reflective coating on the first substrate surface. Such an additional coating on the first substrate surface may comprise a metal layer (such as chromium, titanium, or other metals as described above) and preferably cover both horizontal and vertical surfaces on the first substrate surface. Such coverage may be achieved by sputtering the coating material, for example. In some instances, a portion of the additional reflective coating on the first substrate surface may also function as an electrical trace for propagating electrical signals to or from devices on the substrate.

Various references are made herein to "high-index" or "low-index" materials. For purposes of the present disclosure or appended claims, "high-index" shall refer to refractive indices above about 2.5, while "low-index" shall refer to refractive indices below about 2.5.

It should be noted that various components, elements, structures, or layers "secured to", "connected to", "deposited on", "formed on", or "positioned on" a substrate or layer may make direct contact with the substrate material or layer material, or may make contact with one or more layer(s) or other intermediate structure(s) already present on the substrate or layer, and may therefore be indirectly "secured to", etc, the substrate or layer.

The phrase "operationally acceptable" appears herein describing levels of various performance parameters of optical components or optical devices, such as optical coupling coefficient (equivalently, optical coupling efficiency), optical throughput, undesirable optical mode coupling, optical loss, and so on. An operationally acceptable level may be determined by any relevant set or subset of applicable constraints or requirements arising from the performance, fabrication, device yield, assembly, testing, availability, cost, supply, demand, or other factors surrounding the manufacture, deployment, or use of a particular assembled optical device. Such "operationally acceptable" levels of such parameters may therefor vary within a given class of devices depending on such constraints or requirements. For example, a lesser degree of stray light suppression may be an acceptable trade-off for achieving lower device fabrication costs in some instances, while a greater degree of stray light suppression may be required in other instances in spite of higher fabrication costs. Many other examples of such trade-offs may be imagined. Optical apparatus and fabrication methods therefor as disclosed herein, and equivalents thereof, may therefore be implemented within tolerances of varying precision depending on such "operationally acceptable" constraints or requirements. Phrases such as "substantially complete absorption" and so forth as used herein shall be construed in light of this notion of "operationally acceptable" performance.

For purposes of the present disclosure and appended claims, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: i) it is explicitly stated otherwise, e.g., by use of "either . . . or", "only one of . . . ", or similar language; or ii) two or more of the listed alternatives are mutually exclusive within the particular context, in which case "or" would encompass only those combinations involving non-mutually-exclusive alternatives.

For purposes of the present disclosure or appended claims, the words "include", "including", and so on shall be construed as being open-ended, e.g., "including" shall be construed as "including but not limited to".

While particular examples have been disclosed herein employing specific materials or material combinations and having particular dimensions and configurations, it should be understood that many materials or material combinations may be employed in any of a variety of dimensions or configurations while remaining within the scope of inventive concepts disclosed or claimed herein. It is intended that equivalents of the disclosed exemplary embodiments and methods shall fall within the scope of the present disclosure or appended claims. It is intended that the disclosed exemplary embodiments and methods, and equivalents thereof, may be modified while remaining within the scope of the present disclosure or appended claims.

What is claimed is:

1. An optical apparatus, comprising:
   a substrate;
   at least one optical device on a first substrate surface, at least one optical waveguide on the first substrate surface, or at least one optical element on the first substrate surface;
   a reflection-suppressing layer on at least a portion of a second substrate surface opposite the first substrate surface;
   a metal absorbing layer on at least a portion of the reflection-suppressing layer, so that over at least a portion of the second substrate surface the reflection-suppressing layer is between the second substrate surface and the metal absorbing layer,
   wherein:
   the metal absorbing layer absorbs light over at least a portion of an operative wavelength range of the optical apparatus; and
   at least a portion of the second substrate surface, where the reflection-suppressing layer is between the second substrate surface and the metal absorbing layer, exhibits reflectivity that is reduced relative to reflectivity exhibited by a substrate surface having only the metal absorbing layer present, for internal reflection of light propagating within the substrate over at least a portion of the operative wavelength range of the optical apparatus.

2. The apparatus of claim 1, wherein the operative wavelength range lies between about 1200 nm and about 1700 nm.

3. The apparatus of claim 1 wherein the substrate comprises a high-index semiconductor.

4. The apparatus of claim 3, wherein the substrate comprises silicon or doped silicon and the optical waveguide comprises silica or doped silica.

5. The apparatus of claim 1, wherein the metal absorbing layer comprises chromium or titanium.

6. The apparatus of claim 1, wherein the metal absorbing layer is greater than about 150 nm thick.

7. The apparatus of claim 1, wherein:
the reflection-suppressing layer comprises a metal sublayer on the second substrate surface and a dielectric sublayer between the metal sublayer and the metal absorbing layer; and
the thicknesses of the metal sublayer and the dielectric sublayer are arranged to provide said reduced reflectivity, said arrangement being determined based on the real and imaginary refractive indices of (i) the substrate, (ii) the metal absorbing layer, (iii) the metal sublayer, and (iv) the dielectric sublayer.

8. The apparatus of claim 1, wherein:
the metal absorbing layer comprises chromium or titanium;
the reflection-suppressing layer comprises a metal sublayer on the second substrate surface and a dielectric sublayer between the metal sublayer and the metal absorbing layer;
the metal sublayer comprises chromium or titanium;
the dielectric sublayer comprises silicon, doped silicon, germanium, or doped germanium; and
the thicknesses of the metal sublayer and the dielectric sublayer are arranged to provide said reduced reflectivity.

9. The apparatus of claim 8, wherein:
the metal absorbing layer comprises chromium greater than about 150 nm thick;
the metal sublayer comprises chromium between about 5 nm thick and about 20 nm thick; and
the dielectric sublayer comprises silicon or doped silicon between about 50 nm thick and about 100 nm thick.

10. The apparatus of claim 1, wherein:
the reflection-suppressing layer comprises a first dielectric sublayer on the second substrate surface and a second dielectric sublayer between the first dielectric sublayer and the metal absorbing layer; and
the thicknesses of the first and second dielectric sublayers are arranged to provide said reduced reflectivity, said arrangement being determined based on the real and imaginary refractive indices of (i) the substrate, (ii) the metal absorbing layer, and (iii) the first and second dielectric sublayers.

11. The apparatus of claim 1, wherein:
the metal absorbing layer comprises chromium or titanium;
the reflection-suppressing layer comprises a first dielectric sublayer on the second substrate surface and a second dielectric sublayer between the first dielectric sublayer and the metal absorbing layer;
the first dielectric sublayer comprises silica, doped silica, silicon nitride, or silicon oxynitride;
the second dielectric sublayer comprises silicon, doped silicon, germanium, or doped germanium; and
the thicknesses of the first and second dielectric sublayers are arranged to provide said reduced reflectivity.

12. The apparatus of claim 11, wherein:
the metal absorbing layer comprises chromium greater than about 150 nm thick;
the first dielectric sublayer comprises silica, doped silica, silicon nitride, or silicon oxynitride between about 40 nm thick and about 150 nm thick; and
the second dielectric sublayer comprises silicon or doped silicon between about 40 nm thick and about 150 nm thick.

13. The apparatus of claim 1, wherein:
the reflection-suppressing layer comprises a single dielectric layer; and
the thickness of the dielectric layer is arranged to provide said reduced reflectivity, said arrangement being determined based on the real and imaginary refractive indices of (i) the substrate, (ii) the metal absorbing layer, and (iii) the dielectric layer.

14. The apparatus of claim 1, further comprising a laser on the first substrate surface.

15. The apparatus of claim 1, further comprising a photodetector on the first substrate surface.

16. The apparatus of claim 1, wherein the apparatus comprises a bidirectional optical apparatus, further comprising:
at least one optical waveguide formed on the first substrate surface;
at least one laser on the first substrate surface optically coupled to at least one optical waveguide thereon; and
at least one photodetector on the first substrate surface positioned for receiving an optical signal from at least one optical waveguide thereon.

17. The apparatus of claim 1, further comprising an optical fiber received in a groove in the first substrate surface and positioned for optical coupling with at least one optical waveguide thereon.

18. The apparatus of claim 1, further comprising an optical element on the first substrate surface.

19. The apparatus of claim 1, further comprising a reflective layer on at least a portion of the first substrate surface.

20. An optical apparatus, comprising:
a substrate;
at least one optical device on a first substrate surface, at least one optical waveguide on the first substrate surface, or at least one optical element on the first substrate surface;
a reflection-suppressing layer on at least a portion of a second substrate surface opposite the first substrate surface;
a metal absorbing layer on at least a portion of the reflection-suppressing layer, so that over at least a portion of the second substrate surface the reflection-suppressing layer is between the second substrate surface and the metal absorbing layer,
wherein:
the metal absorbing layer comprises chromium or titanium;
the reflection-suppressing layer comprises a metal sublayer on the second substrate surface and a dielectric sublayer between the metal sublayer and the metal absorbing layer;
the metal sublayer comprises chromium or titanium;
the dielectric sublayer comprises silicon, doped silicon, germanium, or doped germanium; and the thicknesses of the metal sublayer and the dielectric sublayer are arranged so that at least a portion of the second substrate surface, where the reflection-suppressing layer is between the second substrate surface and the metal absorbing layer, exhibits reflectivity that is reduced relative to reflectivity exhibited by a substrate surface having only the metal absorbing layer present, for internal reflection of light propagating within the substrate over at least a portion of the operative wavelength range of the optical apparatus.

21. The apparatus of claim 20, wherein:

the metal absorbing layer is greater than about 150 nm thick;

the metal sublayer is between about 5 nm thick and about 20 nm thick; and the dielectric sublayer is between about 50 nm thick and about 100 nm thick.

* * * * *